United States Patent Office 3,285,224
Patented Nov. 15, 1966

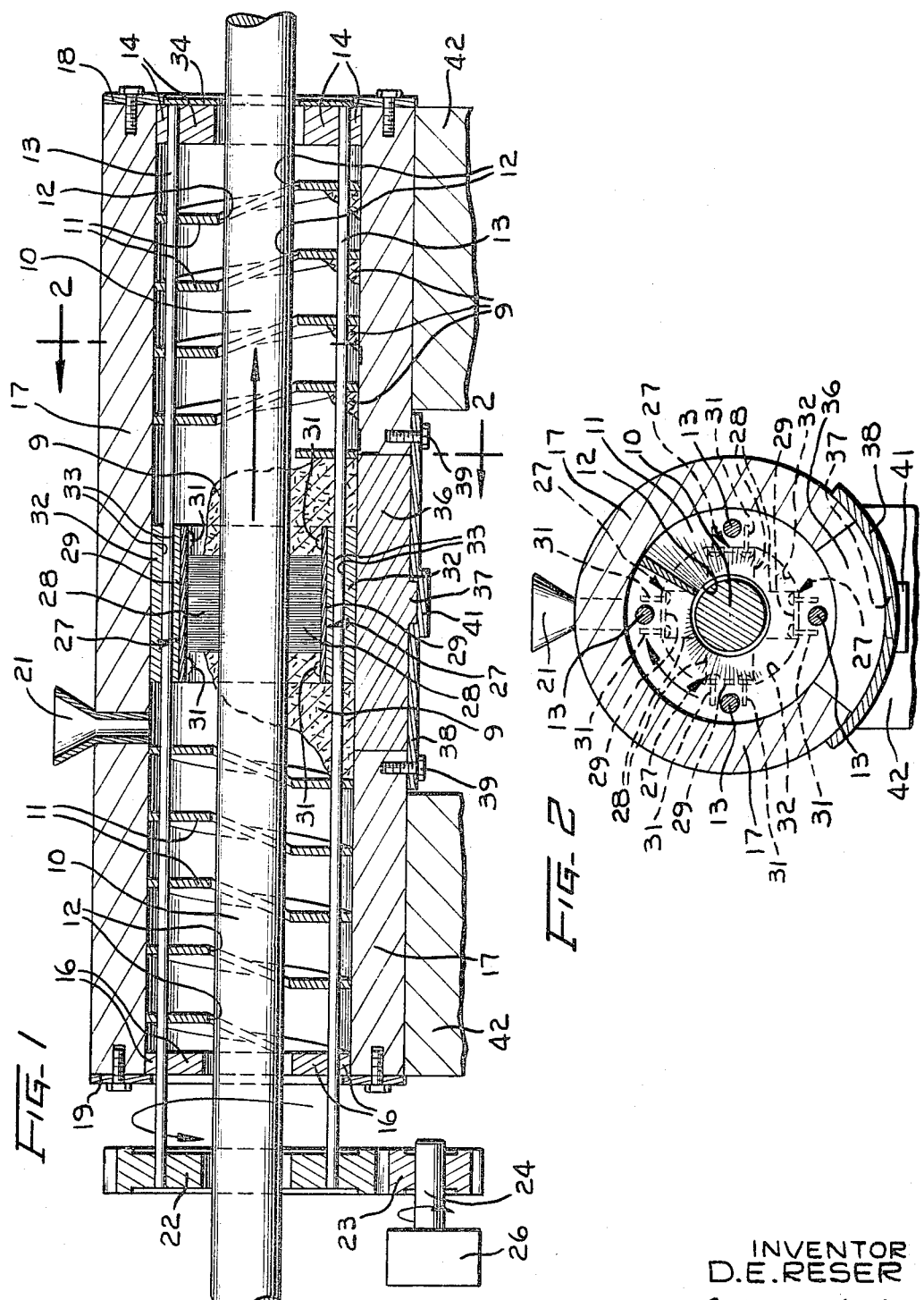

3,285,224
APPARATUS FOR APPLYING A COATING MATERIAL TO AN ELONGATED LONGITUDINALLY ADVANCING ARTICLE
Donald E. Reser, Omaha, Nebr., assignor to Western Electric Company, Incorporated, New York, N.Y., a corporation of New York
Filed July 9, 1963, Ser. No. 293,707
6 Claims. (Cl. 118—405)

This invention relates to article coating apparatus, and more particularly to apparatus for applying a coating of powder or similar type material to an elongated longitudinally advancing article. It is an object of this invention to provide new and improved apparatus of this character.

It is standard practice in the final stages of the manufacture of armored communication cable to coat the cable with asphalt. The cable then is passed through a tank containing a slurry of powdered whiting (such as calcium carbonate) in water, prior to winding the cable on a reel, so that the tacky surfaces of the turns of the cable on the reel will not stick together. The slurry in the tank is premixed and is pumped to the tank through suitable pipes. This arrangement is undesirable because the slurry generally is difficult to pump and because the slurry tends to set up, particularly in the pipes, thus requiring periodic shutdown of the cable making apparatus for cleaning purposes.

Accordingly, another object of this invention is to provide new and improved apparatus for applying a coating of powdered material to an asphalt covered cable.

A further object of this invention is to provide new and improved apparatus for applying a coating of material to an elongated longitudinally advancing article.

A still further object of this invention is to provide new and improved apparatus for applying a coating of material to an elongated longitudinally advancing article uniformly about its entire periphery.

Another object of this invention is to provide new and improved apparatus for applying a coating of dry powder or similar type material to an elongated longitudinally advancing article.

In accordance with the invention, an elongated article is advanced longitudinaly through a passage extending longitudinally through a helical screw, the helical screw being arranged to convey material along a container and to maintain the material in a pile through which the article passes during its advancement. As the article passes through the pile of material, a mechanism moves through the pile of material to agitate the material continuously and to distribute it uniformly about the entire periphery of the article.

In a preferred embodiment of the invention, an elongated article is advanced longitudinally through axially aligned passages extending longitudinally through a pair of oppositely pitched helical screw conveyors. The screw conveyors are mounted adjacent opposite ends of a tubular container in axially aligned spaced relationship and are connected to one another by a suitable mechanism for rotation as a unit. As the screw conveyors are rotated relative to the container they tend to move material in the container away from its opposite ends toward its center to maintain the material in a pile through which the article passes as it advances through the passages in the screw conveyors. Brushes are provided on the mechanism for connecting the screw conveyors and are movable through the pile of material and around the article as the conveyors are rotated, for continuously agitating the material and distributing the material about the entire periphery of the article.

This invention, together with further objects and advantages thereof, will best be understood by reference to the following detailed description, taken in connection with the accompanying drawings in which:

FIG. 1 is a cross-sectional view taken substantially along the center line of the apparatus; and FIG. 2 is a cross-sectional view taken substantially along the line 2—2 of FIG. 1.

Referring to the drawings, it is seen that the illustrated embodiment of the invention is designed to apply powdered material 9 in dry form to an elongated longitudinally advancing article 10, such as an asphalt covered cable. As viewed in FIG. 1, the cable 10 is moving through the material applying apparatus from left to right, from an asphalt applying device (not shown) located to the left of the material applying apparatus. After passing through the material applying apparatus, the cable 10 proceeds to a suitable takeup mechanism (not shown) located to the right of the material applying apparatus, as viewed in FIG. 1, which winds it on a reel.

The material applying apparatus includes a pair of oppositely pitched helical screws 11 which are disposed in axially aligned and axially spaced relationship, and which have axially aligned passages 12 extending longitudinally therethrough and through which the cable 10 passes as it advances through the apparatus. The helical screws 11 are connected to one another for rotation as a unit by a plurality of parallel elongated rods 13 which extend through aligned apertures in the vanes of the screws. At their right-hand ends as viewed in FIG. 1, the rods 13 also extend into apertures in a circular bearing 14, and at their left-hand ends (FIG. 1) the rods extend through apertures in a second circular bearing 16. The rods 13 are secured to the vanes of the helical screws 11 and the bearings 14 and 16 in any suitable manner, as by welding.

The bearings 14 and 16 are mounted for rotation at opposite ends of an elongated tubular barrel or container 17, and are centrally apertured so that the cable 10 can pass therethrough. The rotatable assembly of the helical screws 11, the connecting rods 13 and the bearings 14 and 16 are retained in the barrel against axial movement by a pair of annular retaining rings 18 and 19 secured to the opposite ends of the barrel by suitable screws. The barrel 17 includes a hopper or funnel 21 in the central top portion thereof, through which the powdered material 9 may be introduced into the interior of the barrel in any suitable manner.

Adjacent their left-hand ends, as viewed in FIG. 1, the connecting rods 13 extend beyond the bearing 16 and have a peripherally toothed gear 22 welded or otherwise suitably secured thereto, the gear having a central aperture therein so that the cable 10 can pass axially therethrough. The toothed gear 22 is engaged by a peripherally toothed drive gear 23 carried on a shaft 24 of a motor 26 and arranged to rotate the gear 22 and the assembly including the helical screws 11, the connecting rods 13 and the bearings 14 and 16, clockwise as viewed in FIG. 2. Thus, as shown in FIG. 1, the helical screws 11 tend to convey the powdered material 9 in the barrel 17 in directions away from its opposite ends and toward its center to maintain the material in a pile through which the cable 10 passes during its advancement through the helical screws.

As the cable 10 is being advanced through the pile of the powdered material 9 formed by the helical screws 11, the material is distributed about the entire periphery of the cable by a plurality of brushes 27, which also continuously agitate the material so that the cable does not form a channel therethrough. Each brush 27 includes bristles 28 suitably mounted on a plate-like body member 29 secured at its opposite sides by screws 31 to the inner periphery of an annular mounting ring 32. The mounting ring 32 has apertures 33 formed therethrough for receiving the connecting rods 13 and is welded or otherwise suitably secured to the rods so that the ring and the brushes 27 thereon are rotatable about the cable 10 with the rods, the helical screws 11 and the bearings 14 and 16.

Referring to the right-hand side of FIG. 1, it is seen that the retaining ring 18 at the cable exit end of the barrel 17 carries an annular sealing member 34 which is designed to scrape off any excess powdered material 9 from the cable 10, to prevent an abnormal amount of the powdered material from being carried out of the barrel 17 by the cable. The sealing member 34 may be of any suitable type, as for example, a washer of a flexible material such as rubber which is bonded to the inner periphery of the retaining ring 18, and which has a central aperture of substantially the same size as the cable and through which the cable passes, a mechanism having an adjustable central aperture such as an iris diaphram suitably mounted on the retaining ring 18, or a similar type device. It is apparent that any excess material scraped off of the cable 10 by the sealing member 34, as well as any material falling from the cable as it passes from the pile of material adjacent the center of the barrel to the sealing member, will be conveyed back to the pile by the right-hand (FIG. 1) helical screw 11.

The bottom side of the barrel 17 is provided with a removable portion or trap door 36 which includes a downwardly depending lug 37 to facilitate its removal from the barrel, whereby an operator can clean the interior of the barrel or replace the brushes 27. The removable trap door 36 is retained in position in the barrel 17 by an arcuate plate 38 secured to the underside of the barrel by screws 39 and including a downwardly projecting lug 41 by which it may be grasped to facilitate its removal from adjacent the barrel. The opposite ends of the barrel 17, on either side of the trap door 36 and the retaining plate 38, are suitably supported on a pair of laterally spaced standards 42.

In operation, as the cable 10 is being advanced longitudinally through the material applying apparatus from left to right, as viewed in FIG. 1, the toothed gear 22 is rotated by the drive gear 23 on the motor drive shaft 24 to rotate the assembly including the helical screws 11, the connecting rods 13, the bearings 14 and 16, the brushes 27 and the mounting ring 32, clockwise as viewed in FIG. 2. During this rotation, the helical screws 11 tend to convey the powdered material 9 in the barrel 17 in directions away from its opposite ends and toward its center to maintain the material in a pile (FIG. 1) through which the cable 10 passes as it advances through the helical screws.

At the same time, the brushes 27 move through the pile of material to agitate it constantly so that the advancing cable 10 will not form a channel therethrough, and to distribute the material about the entire periphery of the cable. Subsequently, as the cable 10 passes from the interior of the barrel 17, the seal 34 on the retaining ring 18 tends to scrape off any excess material on the periphery of the cable so that an abnormal amount of the powdered material 9 is not carried out of the interior of the barrel by the cable.

While one embodiment of the invention has been disclosed many modifications will be apparent and it is intended that the invention be interpreted as including all modifications which fall within the true spirit and scope of the invention.

What is claimed is:

1. Apparatus for applying a coating of material to an elongated longitudinally advancing article, which comprises:

container means extending adjacent the path of movement of the article for holding the material;

helical screw means for conveying the material along said container means and maintaining the material in a pile through which the article passes during the advancement thereof, said helical screw means having a passage which extends longitudinally therethrough and through which the article advances; and means movable through the pile of material and around the advancing article for continuously agitating the material and distributing the material about the entire periphery of the article.

2. Apparatus for applying a coating of material to an elongated longitudinally advancing article, which comprises:

container means extending adjacent the path of movement of the article for holding the material;

helical screw means for conveying the material along said container means and maintaining the material in a pile through which the article passes during the advancement thereof, said helical screw means having a passage which extends longitudinally therethrough and through which the article advances; and brush means movable through the pile of material and around the advancing article for continuously agitating the material and distributing the material about the entire periphery of the article.

3. Apparatus for applying a coating of material to an elongated longitudinally advancing article, which comprises:

container means extending substantially parallel to the path of movement of the article for holding the material; and means for conveying the material along said container means in directions away from opposite ends thereof and maintaining the material in a pile through which the article passes during the advancement thereof, said conveying means including a pair of oppositely pitched helical screw blades mounted adjacent the opposite ends of said container means coextensive with respective portions thereof in axially aligned spaced relationship, and having axially aligned passages which extend longitudinally therethrough and through which the article advances.

4. Apparatus for applying a coating of material to an elongated longitudinally advancing article, as recited in claim 3, which further comprises:

agitating means in the space between said pair of oppositely pitched helical screw blades for distributing the material about the periphery of the article.

5. Apparatus for applying a coating of material to an elongated longitudinally advancing article, which comprises:

container means extending substantially parallel to the path of movement of the article for holding the material;

a pair of oppositely pitched helical screw blades mounted adjacent opposite ends of said container means coextensive with respective portions thereof in axially aligned spaced relationship, and having axially aligned passages which extend longitudinally therethrough and through which the article advances; and means for causing relative rotation between said container means and said screw blades so that said screw blades convey the material along said container means in directions away from its opposite ends and maintain the material in a pile through which the article passes during the advancement thereof.

6. Apparatus for applying a coating of material to an elongated longitudinally advancing article which comprises:

tubular container means through which the article advances longitudinally, for holding the material;

a pair of oppositely pitched helical screw conveyors mounted in said container means adjacent opposite ends thereof in axially aligned spaced relationship, and having axially aligned passages which extend longitudinally therethrough and through which the article advances;

means extending between said spaced screw conveyors and connecting said screw conveyors for rotation as a unit;

means for rotating said screw conveyors and said connecting means relative to said container means so that said screw conveyors move the material in directions away from the opposite ends of said container means and maintain the material in a pile through which the article passes during the advancement thereof;

brush means carried by said connecting means and movable through the pile of material and around the article for continuously agitating the material and distributing the material about the entire periphery of the article; and sealing means carried by said container means adjacent the end at which the article exits therefrom, for scraping excess material from the periphery of the article.

References Cited by the Examiner
UNITED STATES PATENTS

| | | |
|---|---|---|
| 1,948,843 | 2/1934 | Dallas. |
| 1,957,791 | 5/1934 | McManis. |
| 2,370,314 | 2/1945 | Jenner _____ 118—405 X |
| 2,768,911 | 10/1956 | Bunch _____ 118—420 X |
| 2,777,784 | 1/1957 | Miller _____ 117—94 X |

CHARLES A. WILLMUTH, *Primary Examiner.*

J. P. McINTOSH, *Assistant Examiner.*